Inventor
Harry C. Moon, Jr.
By
Hofgren, Wegner,
Allen, Stellman & McCord
Attys

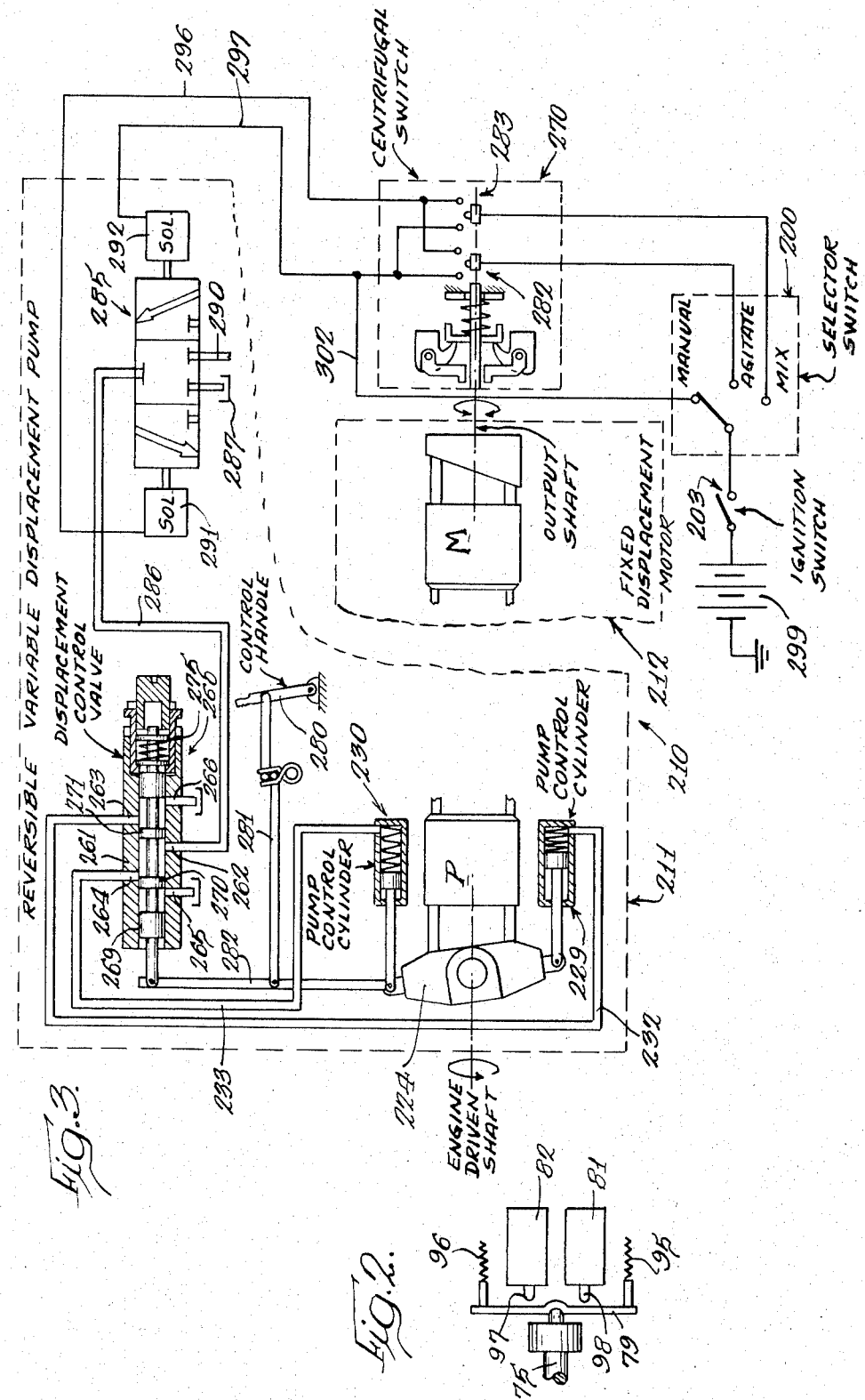

United States Patent Office 3,365,886
Patented Jan. 30, 1968

3,365,886
HYDROSTATIC TRANSMISSION CONTROL
Harry C. Moon, Jr., Rockford, Ill., assignor to Sundstrand Corporation, a corporation of Illinois
Filed Dec. 3, 1965, Ser. No. 511,380
26 Claims. (Cl. 60—53)

ABSTRACT OF THE DISCLOSURE

A hydrostatic transmission for a concrete mixing drum with a selectively operable control for:
(a) Rotating the drum at a high speed during loading,
(b) Maintaining the drum speed at either of two predetermined speeds for mixing and agitating and
(c) Permitting the drum speed to be manually controlled in a forward or reverse direction as desired.

---

This invention relates generally to hydrostatic transmissions and, more particularly, to a hydrostatic transmission and a control therefor adapted to drive a concrete mixer on a vehicle.

In truck-mounted concrete mixers, a rotary drum is provided which mixes or agitates the concrete while the vehicle is moving to the site of unloading. Usually the drum is driven by the vehicle engine which varies in speed over a wide range while it is desirable to maintain the drum speed between certain predetermined limits.

During the normal concrete mixing cycle, the drum is first loaded with proper amounts of cement, water and aggregate. In loading, it is desirable to rotate the drum at a maximum speed, approximately 18 r.p.m. After loading, the drum is rotated at approximately 6 to 10 r.p.m. to thoroughly mix the ingredients. Thereafter, the drum is rotated at approximately 2 to 4 r.p.m. to agitate the mixture while it is being transported.

According to the present invention, a hydrostatic transmission is provided for transmitting power from the vehicular engine to the rotary drum. The transmission includes a positive variable displacement pump driven by the engine to deliver fluid under pressure to a positive displacement motor, where it is converted back into mechanical power to drive the drum. The transmission is fully reversible from full speed in one direction to neutral, and then to full speed in the other direction so that the drum may be rotated reversely as desired.

The transmission control includes a selector switch with which the operator can select the desired operating speed range for the drum. This switch is also movable to a manual position wherein the transmission ratio may be varied in either forward or reverse directions by the operator as desired for discharging the load of concrete from the drum.

With the selector switch in a mix position, the control system automatically controls the displacement of the pumping unit to maintain a substantially constant drum speed in a predetermined mixing range. The selector switch is also movable to a second speed range position where the control circuit varies the pump displacement to maintain a substantially constant drum speed in a lower range for agitating the concrete.

It is, therefore, a primary object of the present invention to provide a new and improved hydrostatic transmission for rotating a concrete mixing drum.

Another object of the present invention is to provide a new and improved hydrostatic transmission, and a control therefor, for selectively maintaining the output speed of the transmission in one of two speed ranges so that the mixing drum may be rotated in either a mixing speed range or in a slower agitate speed range.

A further object of the present invention is to provide a new and improved hydrostatic transmission of the type described above, with a selectively operable manual control which permits the operator to vary the output speed of the transmission as desired.

Still another object of the present invention is to provide a new and improved hydrostatic transmission according to one embodiment of the present invention in which an electric control system is provided for varying the displacement of one of the hydraulic units of the transmission and thus, the output speed of the transmission, including depressible forward and reverse switches which permit the operator to depress one of the switches for increasing the displacement of the hydraulic unit in one direction and to depress the other switch for decreasing the displacement or for increasing the displacement of the hydraulic unit in the other direction to thereby vary the output speed of the transmission as desired. This embodiment of the present invention is particularly useful in installations where it is desirable to have complete remote control of the transmission.

A more specific object of the present invention is to provide a new and improved hydrostatic transmission, and a control therefor, particularly adaptable for rotating a concrete mixing drum, in which an operator selector switch is provided movable to any of a manual, an agitate, or a mixing position; with a solenoid-operated control valve for selectively porting fluid from a source to a displacement control motor connected to vary the pump displacement; a centrifugal switch having two sets of spaced contacts with each of the contacts being arranged to be closed at a predetermined speed so that the first set of contacts controls the speed of the transmission in a first mixing speed range, and a second set of contacts controls the speed of the transmission in an agitating speed range, the contacts being electrically connected to energize the solenoid valve to increase or decrease the pump displacement to maintain the transmission output speed between the predetermined speeds at which the contacts close; and the selector switch is arranged to selectively activate either the first or the second set of contacts so that the operator may select either the mixing or the agitate speed range for the concrete drum.

A still more specific object of the present invention is to provide a new and improved hydrostatic transmission as described immediately above according to one embodiment of the present invention, with a directional control valve between the solenoid-operated control valve and the displacement control motor for reversely varying the displacement of the pump in either direction from neutral as desired.

Another specific object of the present invention is to provide a new and improved hydrostatic transmission of the type described above according to another embodiment of the present invention including separate solenoid-operated forward and reverse control valves, each adapted to selectively port fluid to one of two pump displacement control motors for varying the pump displacement in both directions from neutral, with a control circuit for selectively (1) stopping rotation of the drum by placing both forward and reverse control valves in a drain position so that the pump moves to zero displacement, (2) providing an electrical control for the drum to selectively energize the solenoid valves to vary the transmission ratio as desired, (3) rotating the drum in an agitate speed range by selectively operating the forward control valve in response to signals from a centrifugal speed-responsive switch, (4) rotating the drum in a mixing speed range by selectively energizing the forward valve in response to the centrifugal switch, (5) rotating the drum at a maximum speed for loading by placing the reverse control valve in a drain position and the forward control valve in a position to port fluid to one of the pump control motors to place the pump in maximum displacement position providing a maximum output speed from the transmission.

Further objects and advantages will become apparent from the following detailed description taken in connection with the accompanying drawings, in which:

FIG. 2 is a schematic illustration of a portion of the centrifugal switch forming a part of the present system;

FIG. 3 is a schematic illustration of a hydrostatic transmission according to another embodiment of the present invention.

Figure 1:
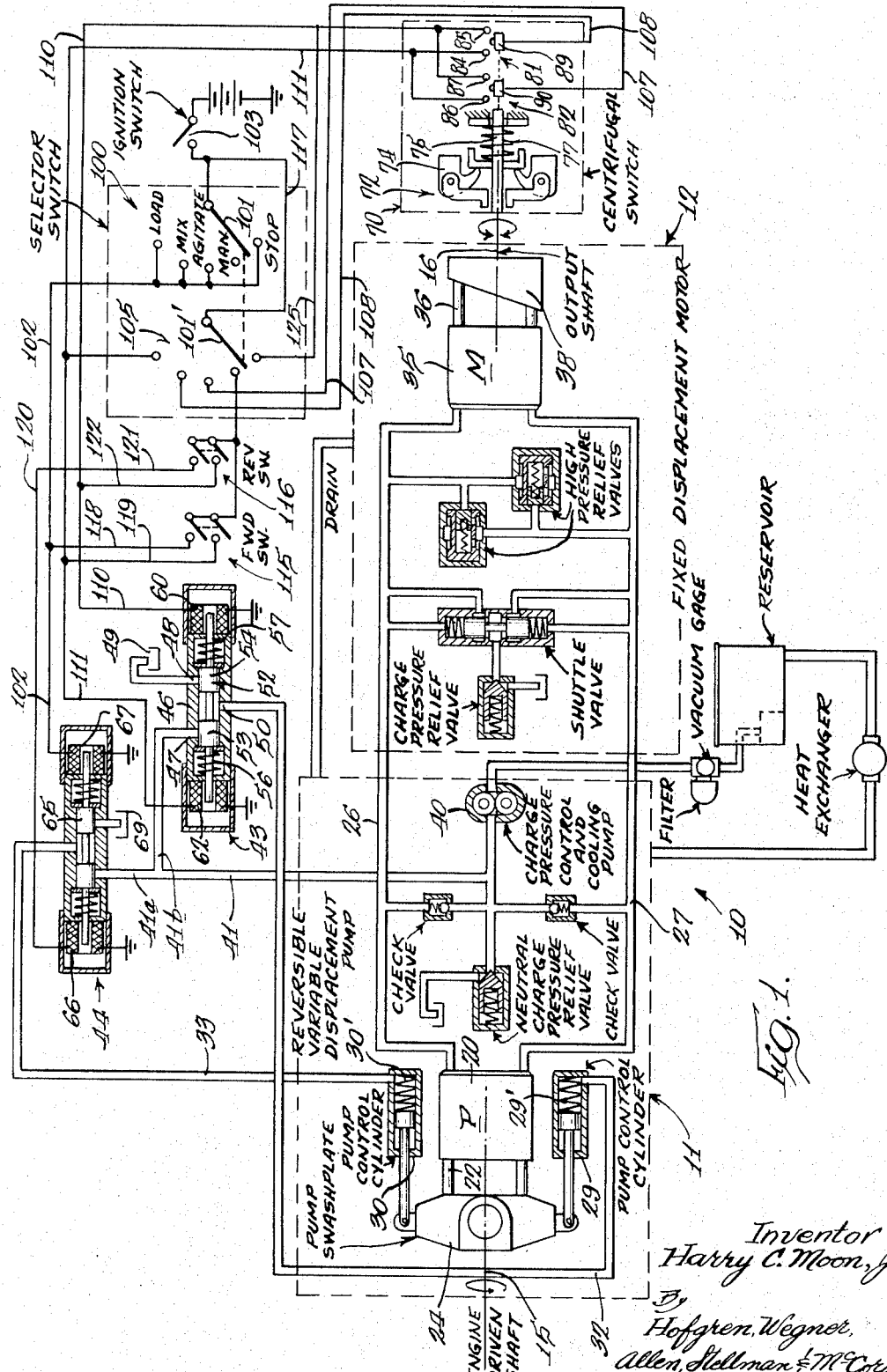
FIG. 1 is a schematic diagram of one embodiment of the present invention particularly adaptable to complete remote operation.

While this invention is susceptible of embodiment in many different forms, there is shown in the drawings and will herein be described in detail embodiments of the invention with the understanding that the present disclosure is to be considered as an exemplification of the principles of the invention and is not intended to limit the invention to the embodiments illustrated. The scope of the invention will be pointed out in the appended claims.

Referring to FIG. 1, a hydrostatic transmission 10 is seen to include a reversible variable displacement axial piston pump 11 and a fixed displacement axial piston motor 12. The transmission 10 is adapted to be driven by the engine of a concrete mixing truck through a suitable shaft represented diagrammatically at 15. The transmission has an output shaft 16 which is adapted to be connected through suitable gearing to rotate the concrete mixing drum (not shown) on the truck.

The pump 11 includes a rotary cylinder block 20 driven by input shaft 15 and having pistons 22 slideable therein. A variable angle swashplate 24 engages the pistons 22 and causes reciprocation thereof in the cylinder block 20. The cam or swashplate 24 is movable in one direction from neutral to deliver fluid to the motor 12 through conduit 26, and movable in the other direction from neutral to deliver fluid through conduit 27 to the motor, while the other conduit returns fluid from the motor to the pump, and in this manner providing a reversible output for rotating shaft 16 and the drum in either direction.

Forward and reverse control cylinders 29 and 30 are provided for positioning the pump swashplate 24. Each of the pump control cylinders includes a piston and cylinder device with neutral biasing springs 29' and 30' for urging the cam member 24 to a neutral position. Forward and reverse control conduits 32 and 33 are connected respectively to the control motors 29 and 30 to convey fluid relative to the control cylinders to vary pump displacement. When fluid is ported to cylinder 29 through conduit 32 and from cylinder 30 through conduit 33, the pump swashplate 24 will pivot in a clockwise direction to increase the displacement of the pump in a forward direction. Conversely, if conduit 33 is pressurized and conduit 32 ported to tank, the swashplate 24 will rotate in a counterclockwise direction, reducing displacement or reversing the flow from the pump if desired.

The motor 12 includes a rotary cylinder block 35 having a plurality of pistons 36 reciprocable therein. A cam member 38 may be of the fixed displacement type and is adapted to cause reciprocation of the pistons 36 and the rotation of cylinder block 35 as fluid is ported to the motor from the pump 11. Cylinder block 35 drives the output shaft 16.

For a complete description of the hydrostatic transmission 10 and particularly the charging and pressure relief circuitry shown, reference is herein made to U.S. Patent Hann 3,212,263 issued Oct. 19, 1965. As the charging and pressure relief circuitry forms no part of the present invention, it is believed unnecessary to describe it in a detail except to state that a charge pressure pump 40 is provided for continuously supplying control fluid under pressure through conduit 41.

Forward and reverse control valves 43 and 44 are provided for selectively porting fluid relative to the pump control cylinders 29 and 30 respectively.

The control valve 43 includes a casing 46 having a control pressure port 47 connected with the source of control fluid through conduit 41b. A tank port 48 is provided for discharging fluid to a suitable drain as at 49. Formed centrally between the ports 47 and 48 is a control port or motor port 50 connected to conduit 32. Port 50 is selectively communicable with either the pressure port 47 or the tank port 48 by a movable spool valve member 52 having lands 53 and 54 which block flow through conduit 32 when the spool is in the neutral position shown in FIG. 1. Valve centering assemblies 56 and 57 are provided for continuously urging the spool member 52 to the neutral position shown.

A first solenoid 60 is provided for pulling spool member 52 to the right providing communication between port 50 and port 48 when the solenoid is energized. A solenoid 62 is provided for pulling spool member 52 to the left providing communication between port 47 and port 50 when it is energized. When both solenoids are deenergized, centering springs 56 and 57 move the spool member 52 to the blocking position shown.

The reverse valve member 44 is identical in construction to forward valve 43 so that it need not be described in detail, except to state that control fluid is ported to conduit 33 from charge passage 41, through conduit 41a when spool member 65 is in its left position as a result of solenoid 66 being energized. When solenoid 67 is energized, conduit 33 communicates with the drain 69. When both solenoids 66 and 67 are deenergized, fluid flow in conduit 33 is blocked.

A constant speed control is provided for maintaining the output speed of shaft 16 in one of two operator-selected speed ranges for mixing or agitating concrete in the drum. Generally, this control is effected by the selective energization of solenoids 60 and 62 in the forward control valve 43 in response to a centrifugal switch output speed sensing device 70 which may be generally of a commercially available type. More specifically, and toward this end, the centrifugal switch 70 is seen to include a flyweight governor 72 driven by output shaft 16 and having radially movable flyweights 74 which axially move a shaft 75 to a position proportional to the speed of output shaft 16. Spring 77 continuously opposes the outward movement of the flyweights 74 in a conventional fashion.

As shown diagrammatically more clearly in FIG. 2, rod 75 engages and moves a switching bar 79 which is permitted to move pivotally about the end of rod 75. The switching bar 79 controls both a high speed switch 81 and a low speed switch 82. Each of the switches 81 and 82 is a single pole double throw unit.

As shown in FIG. 1, switch 81 has spaced contacts 84 and 85, and switch 82 has spaced contacts 86 and 87. Switches 81 and 82 have movable contacts 89 and 90 respectively, movable by rod 75 as will appear hereinafter. Contacts 90 and 86 are arranged to open when the drum speed is above 2 r.p.m., while contacts 90 and 87 are arranged to close when the drum speed is higher than 4 r.p.m. Contacts 89 and 84 are arranged to open when the drum speed rises above 6 r.p.m. while contacts 89 and 85 will close at drum speeds above 10 r.p.m.

Referring again to FIG. 2 for a description of switches 81 and 82, and particularly their manner of achieving selective closure and opening of the contacts at predetermined speeds, the switch bar 79 is biased against the governor rod 75 by a high speed spring 95 and a low speed spring 96. Spring 95 is a stronger spring than spring 96, and provision may be made to adjust the springs to vary the sensitivity of the device. As rod 75 moves to the right in response to an increase in the speed of output shaft 16, bar 79 will pivot in a clockwise direction due to the relative weakness of spring 96. Bar 79 will then engage and begin movement of plunger 97 and switch 82 which serves to open contacts 90 and 86. As the speed of shaft 16 continues to increase, rod 75 will continue to pivot bar 79 urging plunger 97 to the right until contacts 90 and 87 close at speeds higher than 4 r.p.m. A further increase in the speed of shaft 16 will cause bar 79 to pivot counterclockwise engaging the plunger 98 in switch 81 and causing contacts 89 and 84 to open as the drum speed exceeds 6 r.p.m. Continued increase in output shaft speed will cause plunger 75 to move further to the right until, at speeds above 10 r.p.m. contacts 89 and 85 will close. It is apparent that the sensitivity of the device may be varied by adjusting the springs 95 and 96 as desired.

A selector switch 100 is provided to permit the operator to select the desired operating mode of the transmission. With wiper 101 positioned in any of the stop, agitate, mix, or load positions, solenoid 67 is energized through line 102, the wiper 101, and a selectively operable ignition switch 103 which is connected to a source of direct current. Therefore, when the wiper 101 is in any of these positions, pump control cylinder 30 will be ported to tank 69 through reverse control valve 44. This permits control in these modes to be effected by the forward control valve 43.

The selector switch 100 includes a second bank of contacts 105 which correspond with the right-hand bank shown in the drawing. Wiper 101' is mechanically moved with wiper 101 so that the corresponding contacts in both banks are closed simultaneously in a well-known fashion.

With wipers 101 and 101' in the agitate position, power is supplied through line 107 to movable contact 90 in switch 82. On movement of wiper 101 to the mix contact, line 108 supplies power to contact 89 in switch 81.

Solenoids 60 and 62 are energized through lines 110 and 111, respectively. Line 110 is connected to both contacts 85 and 87 while line 111 is connected to both contacts 84 and 86. If contact 90, for example, is alive and engaged with contact 86, line 111 will energize solenoid 62, porting fluid from port 47 through conduit 32 to the forward pump control cylinder 29 increasing the pump displacement which results in an increase in the rotational speed of motor 12. If the speed of output shaft 60 is such as to close contacts 90 and 87, line 110 will energize solenoid 60 connecting port 50 with port 48 thereby draining the pump control cylinder 29 so that the neutral centering springs in the control motors will urge the pump swashplate toward a neutral position reducing the output flow from the pump and reducing the rotational speed of motor 12. In this manner, the output speed of the transmission may be maintained in a predetermined range. As will appear hereinafter, a similar operation is effected in the mix position when switch 81 is selected for the control of valve 43.

The selector switch 100 is also provided with a manual position in which one side of forward and reverse switches 115 and 116 are connected to the direct current source through line 117. Suitable operator control buttons may be provided for closing the switches 115 and 116. Forward switch 115 when closed contacts the source with lines 102 and 111, through branch lines 118 and 119 respectively, energizing solenoids 67 and 62. With solenoids 62 and 67 energized, fluid from gear pump 40 is delivered to pump control motor 29 and from pump control motor 30 to tank 69 through valve 44. Pump displacement then increases until the push button 115 is released.

The reverse switch 116 when closed connects the source with lines 120 and 110, through branch lines 121 and 122, respectively, to energize solenoids 60 and 66. With solenoids 60 and 66 energized, control fluid is ported to pump control cylinder 30 and from pump control cylinder 29, serving to pivot swashplate 24 in a counterclockwise direction.

The operation of the construction of the present invention as shown in FIG. 1 is as follows. With the selector switch 100 in the stop position, and ignition switch 103 closed, solenoid 67 is energized through line 102. This places reverse control valve 44 in the drain position connecting control conduit 33 to tank 69. At the same time, wiper 101' activates line 110 through line 125 so that solenoid 60 is also energized, placing forward control valve 43 in the drain position. This connects conduit 32 to tank 49. Thus, in the stop position, both pump control cylinders 29 and 30 are ported to tank and the neutral centering springs 29' and 30' therein position the pump swashplate 24 in the neutral position. As there is no output flow from the pump 11 at this time, the output shaft 16 will not rotate nor will the concrete mixing drum be driven thereby.

When the concrete mixing drum is being loaded, the operator moves the selector switch 100 to the load position, where solenoid 67 is energized through line 102 and solenoid 62 is energized through line 111. This causes control cylinder 30 to communicate with tank 69 through valve 44, and control fluid under pressure to be ported to control cylinder 29 through forward control valve 43. This biases the swashplate 24 toward a maximum displacement position. With the pump at maximum displacement, the operator may increase the vehicle engine speed to give the desired drum loaded speed, without control by the speed-sensitive switch device.

After the mixing drum is loaded, the operator sets the selector switch 100 to the mix position. This connects the battery with contact 89 in switch 81. At the same time, solenoid 67 is energized through line 102, communicating control cylinder 30 with tank 69. When the drum speed is less than the setting of contact 84, e.g. 6 r.p.m. drum speed, contacts 89 and 84 will close supplying current through line 111 to solenoid 62 shifting the forward valve to its pressure position. This ports fluid to control motor 29 increasing the displacement of pump 11 thereby effecting an increase in the speed of output shaft 16.

When the drum speed is greater than the setting of switch 81, e.g. 10 r.p.m. drum speed, contacts 89 and 85 will close which energizes solenoid 60 through line 110. This connects pump control cylinder 29 to tank 49 through forward control valve 43, permitting the centering springs 30' to move the swashplate 24 toward a neutral position, thus reducing the pump displacement and hence the output shaft speed. When the drum speed is greater than the setting of contact 84 and less than the setting of contact 85, neither of the contacts is closed and thus neither solenoid 60 nor 62 is energized. At such a time, valve 43 is in its centered position, blocking flow in conduit 32 and hence holding the pump swashplate 24 at a fixed angle and maintaining a fixed pump displacement.

If the pump speed should increase while the pump is held at a fixed displacement position, the motor speed would also increase proportionately. If this continues and the motor speed exceeds the high speed setting of switch 81, the switch would energize solenoid 60 through line 110, as noted above, thus reducing the pump displacement and output speed. Conversely, if the pump speed should decrease from the fixed displacement position, the switch 81 would energize solenoid 62 through line 111, increasing the pump displacement and motor speed. In this manner, the output speed of the transmission will remain in a range defined by the predetermined speed settings of the switch contacts when the selector switch is in the mix position.

After the concrete has gone through its mixing cycle, the operator may turn the selector switch 100 to the agitate position. This activates the agitate or low speed switch 82 through line 107. The control function during the agitate cycle is identical to that described above for the mixing cycle except that it maintains the transmission output speed between different predetermined limits, i.e., 2 to 4 r.p.m. drum rotation, through the selective closure of contacts 86 and 87.

When it is desired to discharge the load of concrete, the operator moves the selector switch 100 to the manual position. This connects the battery to one side of both of the forward and reverse switches 115 and 116. Also, solenoid 67 is deenergized so that reverse valve 44 may be controlled by the switches 115 and 116. The operator can now control the speed and direction of the mixing drum by use of the forward and reverse buttons and switches 115 and 116 through suitable buttons. For example, if he desires to increase the drum speed rotation in a forward direction, he depresses forward switch 115 which energizes solenoids 62 and 67. Fluid then flows to control cylinder 29 moving the swashplate toward a maximum forward displacement position. When the operator releases the button, both solenoids 62 and 67 are deenergized closing both valves 43 and 44, thereby blocking flow to and from the pump control cylinders 29 and 30. This locks the swashplate 24 in this position. If at this time the reverse button is depressed closing switch 116, solenoids 66 and 69 will be energized, permitting control fluid to pass through reverse valve 44 to pump control motor 30 and from pump control motor 29 to tank, which serves to decrease the pump displacement from a forward position toward neutral. The longer the reverse button is depressed, the greater the reduction in forward drum speed. Continued depression of reverse switch 116 will reverse the output from pump 11, reversing the direction of drum rotation. If while the drum is rotating in the reverse direction, the operator desires to decrease its speed, he merely depresses the forward button closing forward switch 115 until the desired speed is reached, at which time he releases the button again locking the pump at its displacement setting.

To stop the drum, the operator sets the selector switch at its stop position where both pump control motors 29 and 30 are connected to tank permitting the neutral centering springs 29' and 30' to bias the swashplate to zero displacement.

The above described control system particularly lends itself to remote operation. A second set of forward and reverse buttons can be located at the rear of the truck so that the operator can control the drum speed for discharging the load of concrete. This is particularly desirable in the case of a trailer-mounted mixer where mechanical or hydraulic linkage to the pump would be impractical. If desired, the selector switch 100 may be automatically activated by a clock timer or a drum revolution counting device of conventional construction. In such a construction the selector switch 100 may be set automatically at the mix position and automatically cycle to the agitate position after a fixed time or fixed number of drum revolutions.

The second embodiment of the present invention shown in FIG. 3 is generally similar to the FIG. 1 embodiment except that it employs a manually operable directional control valve 260 to provide the operator with a manual control of the transmission in place of the electro-hydraulic control in the FIG. 1 embodiment.

The hydrostatic transmission 210 includes a variable displacement pump 211 and a fixed displacement motor 212 identical in construction to pump 11 and motor 12 in the FIG. 1 embodiment so that a specific description thereof is not necessary. The displacement of the pump 211 is controlled by fluid motors 229 and 230 through conduits 232 and 233 respectively.

The directional control valve 260 includes a valve housing 261 having a supply port 262 and motor control ports 263 and 264 selectively connectable with either the supply port 262 or drain ports 265 and 266. A slideable spool member 269 having lands 270 and 271 selectively communicates motor ports 263 and 264 with either the drain ports or the supply port 262. That is, land 270 is movable (1) to a supply position shown where port 262 communicates with port 264, (2) to a blocking position where it blocks port 264, and (3) to a drain position to provide communication between port 264 and drain port 265. In a similar manner, land 271 either blocks port 263 or connects it with one of the drain ports 266 or the supply port 262.

Spool member 269 is initially positionable by a pivotally mounted manual control handle 280 through a linkage mechanism 281 connected approximately at the midportion of a link 282. Link 282 is connected at one end to the spool member 269 and at the other end to swashplate member 224.

Assuming that port 262 is pressurized by fluid from a suitable source through conduit 290, movement of the control handle to the position shown will cause fluid to flow through port 262 into conduit 233 and into pump control motor 230 to move the swashplate 224 toward maximum reverse displacement. As cam member 224 pivots in this direction, it pivots link 282 about the end of link 281 causing the spool member 269 to shift back to the right eventually blocking flow through port 264 to maintain the desired displacement. Link 282 thus serves to effect feedback action on the directional control valve 260.

If the control handle is rotated to the right for a forward displacement of the pump, spool valve member 269 will shift to the right providing communication between port 262 through conduit 232 and control motor 229, rotating cam member 224 toward maximum forward displacement. Movement of the cam member causes link 282 to pivot counterclockwise about the end of link 281 in feedback fashion moving spool valve 269 to the left until the land 271 blocks port 263. With this control, the operator may, by controlling handle 280, vary the displacement of the pump 211 as desired and thereby vary the rotational speed and direction of the mixing drum.

Handle 280 is releasably retained in any position to which it is moved by a suitable retarding means not shown. A centering spring 275 serves to take up backlash and return valve member 269 to the center neutral position when handle 280 is in neutral.

A closed-center three-way valve 285 is provided for controlling the flow of fluid relative to the displacement control valve 260 in conduit 286. More specifically, when valve 285 is in its central position, flow through conduit 286 is blocked. In its left position, it permits flow from the source of control fluid passage 290 into conduit 286. And in its right position, valve 285 permits flow from conduit 286 to a suitable tank 287. A push solenoid 291 is provided for moving valve 285 to its right position and a second push solenoid 292 is provided for moving valve 285 to its left position. When both solenoids 291 and 292 are deenergized, the valve moves to its central position blocking flow in conduit 286. Solenoids 291 and 292 are energized by lines 296 and 297 through a centrifugal switch 270 in an identical fashion with centrifugal switch 70 shown in FIG. 1.

A selector switch 200 has manual, mix and agitate positions, and is somewhat simplified as compared to the switch 100. Swith 200 is selectively operable to connect the battery 299 through ignition switch 203 to either switch 282 or switch 283. In a similar fashion to that noted above in the FIG. 1 embodiment, switch 282 controls valve 285 in the slower agitate speed range, while switch 283 controls valve 285 in the upper mixing speed range.

With the ignition switch 203 closed and selector switch 200 in the manual position, solenoid 292 is energized through line 297 and line 302. This moves valve 285 to the left, placing conduit 286 in communication with supply passage 290. In this mode the operator may move the control handle 280 as desired to vary the speed of the mixing drum in either direction at any speed up to the maximum capacity if pump 211.

When the operator places switch 200 in the agitate position, switch 282 selectively controls solenoids 291 and 292 in a manner similar to that described above with respect to FIG. 1. When the switch is placed in this position, the operator moves the control handle 280 to the maximum forward displacement position so that valve 285 in effect controls the supply and draining of fluid through conduit 232 connected with pump control motor 229. The operation of the system is the same when the selector switch 200 is in the mix position, except that high speed switch 283 controls the output speed of the transmission in an upper mixing range above the agitate range.

What is claimed is:

1. A hydrostatic transmission adapted to rotate a concrete mixing drum and driven by a variable speed prime mover, comprising: a hydraulic pump unit adapted to be driven by the prime mover, a hydraulic motor unit adapted to drive the drum, conduit means connected to the pump to deliver fluid to the motor, means for varying the displacement of one of said hydraulic units to vary the speed of said motor, means for sensing the output speed of said motor, first control means responsive to the sensing means and connected to said displacement varying means operative below a first predetermined speed to increase the output speed of said motor, and second control means responsive to said sensing means and connected to said displacement varying means operative above a second predetermined speed to decrease the output speed of said motor to maintain the output speed thereof in a range between said first and second predetermined speeds.

2. A hydrostatic transmission as defined in claim 1, wherein said displacement varying means includes a fluid motor, a source of control fluid, a selectively operable valve movable to a first position for porting control fluid to said fluid motor to increase said output speed, said valve being movable to a second position to port fluid from said fluid motor to decrease said output speed, said first control means connected to move said valve to said first position, said second control means being connected to move said valve to said second position.

3. A hydrostatic transmission as defined in claim 2, wherein said speed sensing means includes a governor, said control means includes a switch having first and second contacts, said first contact being positioned to be closed at said first predetermined speed, and said second contact being positioned to be closed at said second predetermined speed, first electric circuit means connected to said first contact for shifting said valve to said first position, second electric circuit means connected to said second contact for shifting said valve to said second position.

4. A hydrostatic transmission as defined in claim 1, including third control means responsive to said sensing means and connected to said displacement varying means operative below a third predetermined speed to increase the transmission output speed, fourth control means responsive to said sensing means and connected to said displacement varying means operative above a fourth predetermined speed to decrease the transmission output speed, said third and fourth predetermined speeds being below said first and second predetermined speeds, and speed selection means for selectively activating said first and second control means or said third and fourth control means.

5. A hydrostatic transmission as defined in claim 4, wherein said speed sensing means includes a governor driven by said hydraulic motor unit, said first and second control means including a switch having first and second contacts, said first contact positioned to be closed at said first predetermined speed, said second contact positioned to be closed at said second predetermined speed, said third and fourth control means including a second switch having third and fourth contacts, said third contact being positioned to be closed at said third predetermined speed, said fourth contact being positioned to be closed at said fourth predetermined speed.

6. A hydrostatic transmission as defined in claim 5, wherein said displacement varying means includes a fluid motor, a source of control fluid under pressure, a valve member for controlling the flow of fluid relative to said fluid motor, said valve being movable to a first position to port control fluid from said source to said fluid motor to increase the output speed and to a second position to port fluid from said fluid motor to decrease the output speed and to a third position to block fluid flow relative to said fluid motor to maintain the displacement of said one hydraulic unit; said first and third contacts being connected to move said valve to said first position, said second and fourth contacts being connected to move said valve to said second position; said selector means including a source of electrical power, and a selector switch connected to said power source movable to selectively activate either said first switch or said second switch to maintain the output speed of the transmission in either of two ranges.

7. A hydrostatic transmission as defined in claim 3 wherein said valve member is movable to a third position blocking flow relative to said fluid motor to maintain the displacement of said one hydraulic unit, said first and second control means moving said valve to the blocking position when the output speed is above said first predetermined speed and below said second predetermined speed.

8. A hydrostatic transmission adapted to rotate a concrete mixing drum and driven by a variable speed prime mover, the combination, comprising: a hydraulic pump unit adapted to be driven by the prime mover, a hydraulic motor unit adapted to drive the drum, conduit means connected to the pump to deliver fluid to the motor, means for varying the displacement of one of said hydraulic units to vary the speed of said motor, first control means for maintaining a substantially constant output speed of said hydraulic motor unit, second control means connected to said displacement varying means to vary the speed ratio of the transmission as desired, and selector means movable to a first position for activating said first control means and movable to a second position for activating said second control means.

9. A hydrostatic transmission as defined in claim 8, wherein said one hydraulic unit is the pump, said displacement varying means including means for varying the displacement of said pump in both directions from neutral to obtain forward and reverse operation of said hydraulic motor unit, said second control means including manually operative means for moving said displacement varying means in both directions from neutral as desired.

10. A hydrostatic transmission as defined in claim 8, and further including third control means for maintaining a substantially constant output speed below said first constant output speed, means for sensing the output speed of said hydraulic motor unit, said first and third control means being responsive to said sensing means, said selector means being movable to a third position to activate said third control means.

11. A hydrostatic transmission as defined in claim 10, said displacement varying means including a fluid operable motor connected to vary the displacement of said pump, said fluid motor being adapted to vary the displacement of the pump in both directions from neutral, a source of control fluid under pressure, said second manual control means including a directional control valve for selectively porting fluid from said source to said fluid operable motor, and manual linkage means for positioning said directional control valve as desired.

12. A hydrostatic transmission as defined in claim 11, including a second control valve arranged in series between said source and said directional control valve, said second valve being movable to a first position to port fluid from said source to said directional control valve and movable to a second position to port fluid from said directional control valve to a tank and movable to a third position to block flow relative to said directional control valve and said fluid operable motor, said first and third control means being connected to operate said second control valve to maintain their respective output speeds.

13. A hydrostatic transmission as defined in claim 12, wherein said sensing means includes a rotary governor driven by said hydraulic motor unit, said first control means including a first speed control switch driven by said governor and having first and second contacts, said first contact being positioned to be closed at a first predetermined speed, said second contact being positioned to be closed at a second predetermined speed, first solenoid means for moving said second control valve to said first position, second solenoid means for moving said second valve to said second position, said first and second contacts being connected to energize said first and second solenoids respectively, said third control means including a second speed control switch actuable by said governor and having third and fourth contacts positioned to be closed at third and fourth predetermined speeds, said third and fourth predetermined speeds being below said first and second predetermined speeds, said third and fourth contacts being connected to energize said first and second solenoids respectively; said selection means including a source of electrical current, a switch movable to a first position to energize said first solenoid to port fluid to said directional control valve thereby permitting control as desired through the manual control, said switch being movable to a second mix position connecting said first speed control switch with said source of current to maintain the output speed of the hydraulic motor in an upper speed range, said switch being movable to a third position connecting said source of current to said second speed control switch to maintain the output speed of the transmission in a low speed range.

14. A hydrostatic transmission as defined in claim 10, wherein said displacement varying means includes fluid operable motor means connected to vary the pump displacement in both directions from neutral, a source of control fluid under pressure, a first control valve for porting control fluid to said fluid motor to move said displacement varying means in one direction, a second control valve for porting fluid to said fluid operable motor to move said displacement varying means in the other direction, said second control means including selectively operable forward and reverse switch means for moving said control valves to vary the output speed as desired.

15. A hydrostatic transmission as defined in claim 10, and further including fourth "load" control means connected to said displacement varying means to provide maximum displacement of said one hydraulic unit and maximum output speed, said selection means being movable to a fourth position to activate said fourth control means.

16. A hydrostatic transmission as defined in claim 15, and further including fifth "stop" control means for moving said displacement varying means to a neutral position, said selection means being movable to activate said fifth control means.

17. A hydrostatic transmission as defined in claim 14, wherein said fluid operable motor means includes a first motor for varying the displacement of the pump in one direction and a second motor for varying the displacement of the pump in the other direction, said first control valve being movable to a first position to port fluid from said source to said first motor and to a second position to port fluid from said first motor, said second control valve being movable to a first position to port control fluid to said second motor and to a second position to port fluid from said second motor.

18. A hydrostatic transmission as defined in claim 17, wherein said first control means includes a first speed control switch having first and second contacts adapted respectively to be closed respectively at first and second predetermined speeds, first solenoid means for moving said first control valve to said first position, second solenoid means for moving said first control valve to said second position, said first contact being connected to energize said first solenoid means, said second contact being connected to energize said second solenoid means.

19. A hydrostatic transmission as defined in claim 18, wherein said third control means includes a second speed control switch having third and fourth contacts, said third and fourth contacts being positioned to be closed at third and fourth predetermined speeds, said third contact being connected to energize said first solenoid, said fourth contact being connected to energize said second solenoid, said selector means including a source of current, and a selector switch connected to said source of current and movable to said first position to activate said first speed switch and to another position to activate said second speed switch to maintain the transmission output speed in either of two constant speed ranges.

20. A hydrostatic transmission as defined in claim 18, and including a fourth load circuit connected to energize the first solenoid on the first control valve and the second solenoid on the second control valve to thereby position the displacement varying means at maximum displacement for loading, said selection means being movable to a fourth position to activate said fourth control means.

21. A hydrostatic transmission as defined in claim 18, wherein said second control means includes a forward circuit for energizing the first solenoid on the first control valve and the second solenoid on the second control valve, and a reverse circuit for energizing the second solenoid on the first control valve and the second solenoid on the second control valve.

22. A hydrostatic transmission, the combination comprising: a hydraulic pump unit adapted to be driven by a prime mover, a hydraulic motor unit adapted to drive a load, conduit means connected to the pump to deliver fluid to the motor, means for varying the displacement of one of said hydraulic units to vary the speed of said motor, said displacement varying means including motor means for varying the displacement of said one hydraulic unit in both directions, first selector circuit means for energizing said motor means to increase the displacement of said one unit, second selector circuit means for energizing said motor means to decrease the displacement of said one unit, said motor means including a first fluid operable motor for increasing the displacement of said one unit in one direction from neutral, and a second fluid operable motor for increasing the displacement of said one unit in the other direction from neutral to achieve a reversible output from said one unit, a source of control fluid under pressure, a first control valve for selectively porting control fluid to said first fluid operable motor, a second control valve for selectively porting control fluid to the second fluid operable motor, first solenoid means connected to operate said first control valve, second solenoid means connected to operate said second solenoid valve, said first circuit being connected to energize said first solenoid means and including a manually depressible switch for closing the circuit and thereby increasing the displacement of said one unit in said one direction until released, and said second circuit being connected to energize said second solenoid means and including a depressible switch for closing said second circuit and moving said displacement varying means in the other direction until released.

23. A hydrostatic transmission as defined in claim 22, wherein said first and second control valves are each movable to a blocking position to maintain the displacement of the hydraulic unit, said solenoids when inadequate per se to switch on said circuit element, such control valves to their blocking positions.

24. A hydrostatic transmission, the combination comprising: a hydraulic pump unit adapted to be driven by a prime mover, a hydraulic motor unit adapted to drive a load, conduit means connecting the pump to deliver fluid to the motor, means for varying the displacement of one of said hydraulic units to vary the speed of said motor, means for continuously urging said displacement varying means to a neutral position, said displacement varying means including first motor means for varying the displacement in one direction and second motor means for varying the displacement in the other direction, first control means for maintaining a substantially constant output speed of said hydraulic motor unit including means for delivering fluid to one of said motor means and for connecting the other of said motor means to a drain upon a first deviation of the desired constant speed and means for connecting both of said motor means to a drain upon a second deviation of the desired constant speed so that the displacement varying means will move toward neutral, and a manually operable control means for varying the speed ratio of the transmission as desired including means for simultaneously porting fluid to one of said motor means and from the other of said motor means and selectively operable means for simultaneously porting fluid to the other of said motor means and from said one of said motor means.

25. A hydrostatic transmission, the combination comprising: a hydraulic pump unit adapted to be driven by a prime mover, a hydraulic motor unit adapted to drive a load, conduit means connecting the pump to deliver fluid to the motor, means for varying the displacement of one of said hydraulic units to vary the speed of said motor, means for continuously urging said displacement varying means to a neutral position, said displacement varying means including first motor means for varying the displacement in one direction and second motor means for varying the displacement in the other direction, first valve means movable to a first position connecting the first motor means to a source of fluid under pressure and to a second position connecting said first motor means to a drain, said first valve means being movable to a position blocking flow relative to said first motor means, second valve means separate from said first valve means movable to a first position connecting said second motor means to a source of fluid under pressure and to a second position connecting said second motor means to a drain, said second valve means being movable to a position blocking flow relative to said second motor means, and control means for said first and second valve means.

26. A hydrostatic transmission as defined in claim 25, wherein said control means includes manually operable means for simultaneously placing said first valve means in said first position and said second valve means in said second position, and for selectively simultaneously placing said first valve means in said second position and said second valve means in said first position, said control means further including a selectively operable constant speed control including means for simultaneously placing said first valve means in said first position and said second valve means in said second position in response to a first deviation from said constant speed, and for simultaneously placing said first valve means in said second position and maintaining said second valve means in said second position in response to a second deviation from said constant speed.

References Cited

UNITED STATES PATENTS

| | | | |
|---|---|---|---|
| 3,107,490 | 10/1963 | Cooper et al. | 60—53 |
| 3,168,295 | 2/1965 | Dorrell et al. | 60—53 X |

EDGAR W. GEOGHEGAN, *Primary Examiner.*

UNITED STATES PATENT OFFICE
CERTIFICATE OF CORRECTION

Patent No. 3,365,886                        January 30, 1968

Harry C. Moon, Jr.

It is certified that error appears in the above identified patent and that said Letters Patent are hereby corrected as shown below:

In the heading to the printed specification, line 4, "Illinois" should read -- Delaware --.

Signed and sealed this 10th day of March 1970.

(SEAL)
Attest:

Edward M. Fletcher, Jr.             WILLIAM E. SCHUYLER, JR.
Attesting Officer                   Commissioner of Patents